United States Patent [19]

Cho et al.

[11] Patent Number: 5,708,813
[45] Date of Patent: Jan. 13, 1998

[54] PROGRAMMABLE INTERRUPT SIGNAL ROUTER

[75] Inventors: Hoe To Cho, Hsing Chung; Ming Huann Yuan, Chung Li, both of Taiwan

[73] Assignee: Digital Equipment Corporation, Maynard, Mass.

[21] Appl. No.: 353,759

[22] Filed: Dec. 12, 1994

[51] Int. Cl.⁶ .................................................. G06F 13/00
[52] U.S. Cl. ................................................................ 395/733
[58] Field of Search ...................... 395/733–739, 395/868, 421.01

[56] References Cited

U.S. PATENT DOCUMENTS

| | | | |
|---|---|---|---|
| 3,828,320 | 8/1974 | Dinerman et al. | 395/421.01 |
| 3,829,839 | 8/1974 | Jeane | 395/739 |
| 4,023,143 | 5/1977 | Brannstein | 395/736 |
| 4,282,572 | 8/1981 | Moore, III et al. | 395/421.01 |
| 4,413,315 | 11/1983 | Kwrakake | 395/421.01 |
| 4,420,806 | 12/1983 | Johnson, Jr. et al. | 395/733 |
| 4,438,489 | 3/1984 | Heinrich et al. | 395/733 |
| 4,628,449 | 12/1986 | Zardiackas | 395/733 |
| 4,630,041 | 12/1986 | Casamatta et al. | 395/735 |
| 4,698,753 | 10/1987 | Hubbins et al. | 395/200.05 |
| 4,761,732 | 8/1988 | Eltumiati et al. | 395/736 |
| 4,875,157 | 10/1989 | Frimmel, Jr. et al. | 395/421.01 |
| 4,967,342 | 10/1990 | Lent et al. | 395/739 |
| 5,070,447 | 12/1991 | Koyama | 395/738 |
| 5,083,261 | 1/1992 | Wilkie | 395/738 |
| 5,146,595 | 9/1992 | Fujiyama et al. | 395/736 |
| 5,218,703 | 6/1993 | Fleck et al. | 395/737 |
| 5,257,385 | 10/1993 | Roskowski et al. | 395/738 |
| 5,261,107 | 11/1993 | Klim et al. | 395/725 |
| 5,317,747 | 5/1994 | Mochida et al. | 395/725 |
| 5,379,434 | 1/1995 | DiBrino | 395/737 |
| 5,410,708 | 4/1995 | Miyamori | 395/737 |
| 5,428,799 | 6/1995 | Wood et al. | 395/739 |

*Primary Examiner*—Ayaz R. Sheikh
*Attorney, Agent, or Firm*—Dirk Brinkman

[57] ABSTRACT

In a computer system, a random access memory of an interrupt router is programmed to store data as bit patterns at a plurality of memory locations. Each bit pattern correspond to a specific routing from a plurality of sources to a fixed number of interrupt input lines. The number of bits in each bit pattern equivalent to the number of interrupt input lines. The addresses of the memory, during operation, being selected by the interrupt signals generated by a plurality of interrupt sources.

5 Claims, 3 Drawing Sheets

PROGRAMMABLE INTERRUPT SIGNAL ROUTER

FIELD OF THE INVENTION

The invention relates generally to computer systems, and more specifically to interrupt signals generated by the computer system.

BACKGROUND OF THE INVENTION

In computer systems, interrupt signals are used to signal asynchronous events which may require immediate attention. For example, an input/output (I/O) device may use interrupts to signal the availability of data, or an unanticipated conditions.

In personal computers (PCs), the methods used to route interrupt signals to the central processor unit (CPU) are usually dictated by de facto industry standards. For example, in PCs compatible with the "PCAT" standard, the CPU, typically an INTEL "x86" type of processor, is equipped with a single port for receiving interrupt signals from I/O devices.

However, industry standard I/O buses have been designed which can communicate more than one interrupt signal at any time. For example, I/O buses designed according to the industry "EISA" standard can concurrently communicate fifteen interrupt signals.

In order, to map all of the possible interrupt signals to the signal CPU interrupt port, a Programmable Interrupt Controller (PIC) is used. The PIC, for example an INTEL "8259A," is connected to an EISA I/O bus. The PIC converts the interrupts to an 8-bit vector which is communicated over the buses to select an interrupt service routine corresponding to the received interrupts.

Another industry standard bus, the PCI bus, can generate up to four interrupt signals for each I/O interface connected to the bus. Since the number of different I/O interfaces available, for example, for disks, tapes, printer, terminals, CD ROMS, audio, video, and so forth, is quite large, the number of different combinations of I/O interface which can be used in a computer system can be in the thousands. Existing Basic Input/Output System (BIOS) firmware and operating system (O/S) software already comprehend the EISA interrupt structure and routing mechanism. The problem is to map the various possible combinations of PCI interrupt signals onto the interrupt input lines of the PIC.

In prior art system, a pseudo cross-bar type of device is sometimes used. The device includes a set of programmable registers which can be used to select one of a small number of predetermined combinations during system initialization.

However, PCs are increasingly being used to perform more complex functions. For example, PCs configured as servers can be equipped with a relatively large number of I/O interface. For example, a modern server type of PC may be equipped with twelve I/O "slots", six each for EISA and PCI compatible interfaces.

Clearly, configurating such systems for different applications is severely limited by the small number of interrupt mapping combinations that are possible. Therefore, it is desired, that the number of combinations for routing interrupt signals from a large number of possible interrupt sources to a small, and fixed number of interrupt input lines be increased without substantially increasing the complexity and cost of the system.

SUMMARY OF THE INVENTION

In a computer system, a random access memory of an interrupt router is programmed to store data as bit patterns at a plurality of memory locations. Each bit pattern correspond to a specific routing from a plurality of sources to a fixed number of interrupt input lines. The number of bits in each bit pattern equivalent to the number of interrupt input lines. The addresses of the memory, during operation, being selected by the interrupt signals generated by a plurality of interrupt sources.

DETAILED DESCRIPTION OF A PREFERRED EMBODIMENT

Figure 1:
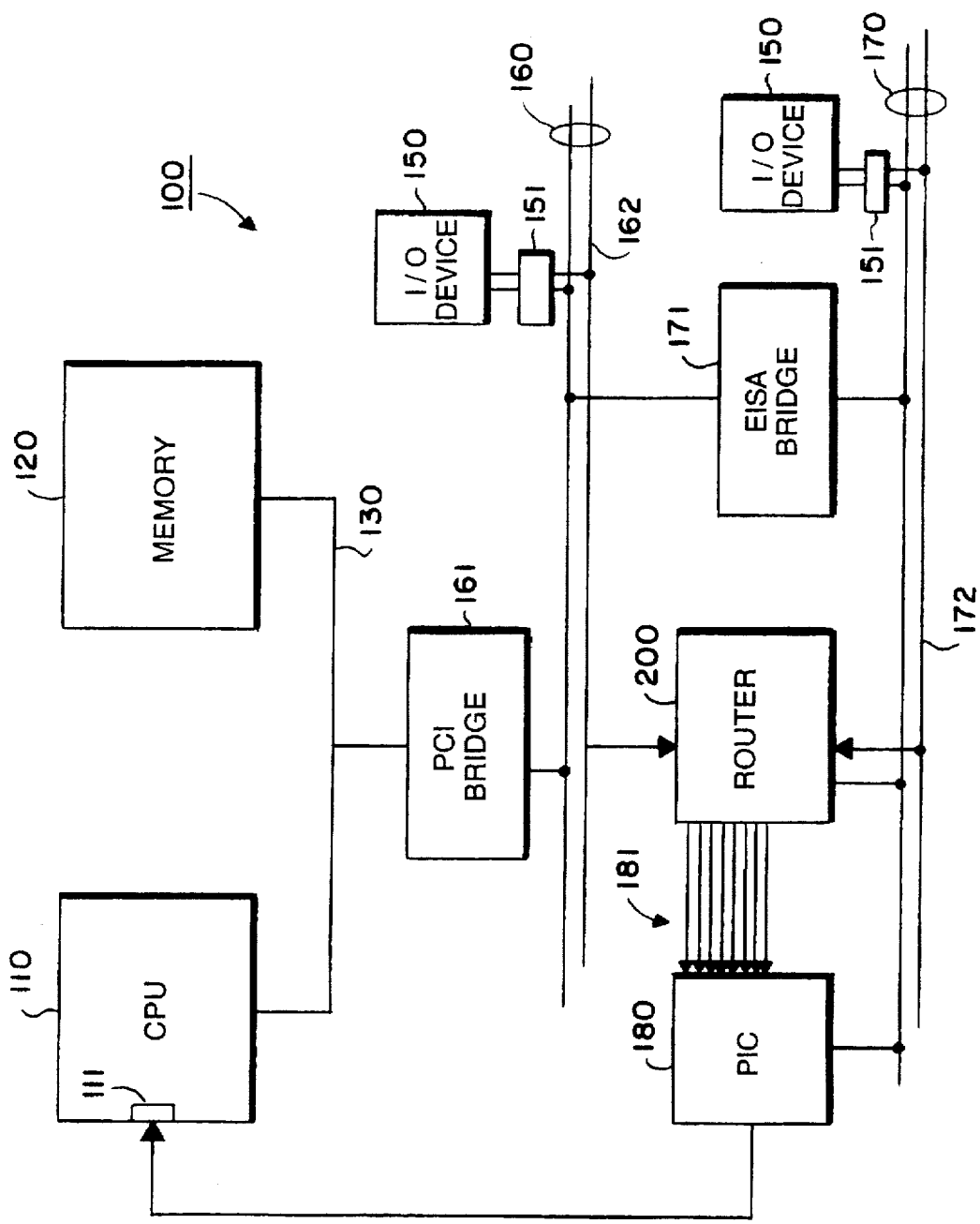
FIG. 1 is a block diagram of a computer system according to the invention.

FIG. 1 shows a computer system 100 including a central processing unit 110 and a memory 120 connected to each other by a processor bus 130. The processor bus 130, as well as other buses described below, can include a plurality of signaling lines for communicating data, address, and control signals. The control signals can include interrupt signals for signaling asynchronous, or unanticipated events.

For the purpose of communicating with input/output (I/O) devices 150, the system includes I/O buses 160 and 170. The buses are connected to the devices via I/O interface 151 typically plugged in to the buses 160 and 170. In a preferred embodiment of the invention, the buses 160 and 170 are designed according different industry standards, for example, PCI and EISA, respectively. A PCI bridge 161 is used to couple the PCI bus 160 to the processor bus 130, and an EISA bridge 171 is used to connect the EISA bus 170 to the PCI bus 160.

The EISA bus 170 can communicate up to fifteen interrupt signals on lines 172. The CPU 110, for example an INTEL "x86" processor, is designed with a single interrupt input port 111 for receiving I/O interrupt signals.

A Programmable Interrupt Controller (PIC) 180, implemented as, for example, an INTEL "8259A" device, can be used to connect the interrupt input lines 181 to the single I/O interrupt port 111 of the CPU 110. The PIC 180, upon detecting the interrupt signals, generates an eight bit vector which is communicated to the CPU over the buses.

The PCI bus 160 also can include a plurality of interrupt lines 162. However, each PCI interface 151 can have four associated interrupt lines. The problem to be solved by the invention is to map the PCI interrupt lines 172, which can be of numerous combinations onto the fixed number of interrupt input lines 181 connected to the PIC 180.

In a preferred embodiment of the invention, this task is performed by a programmable interrupt signal router 200.

Figure 2:
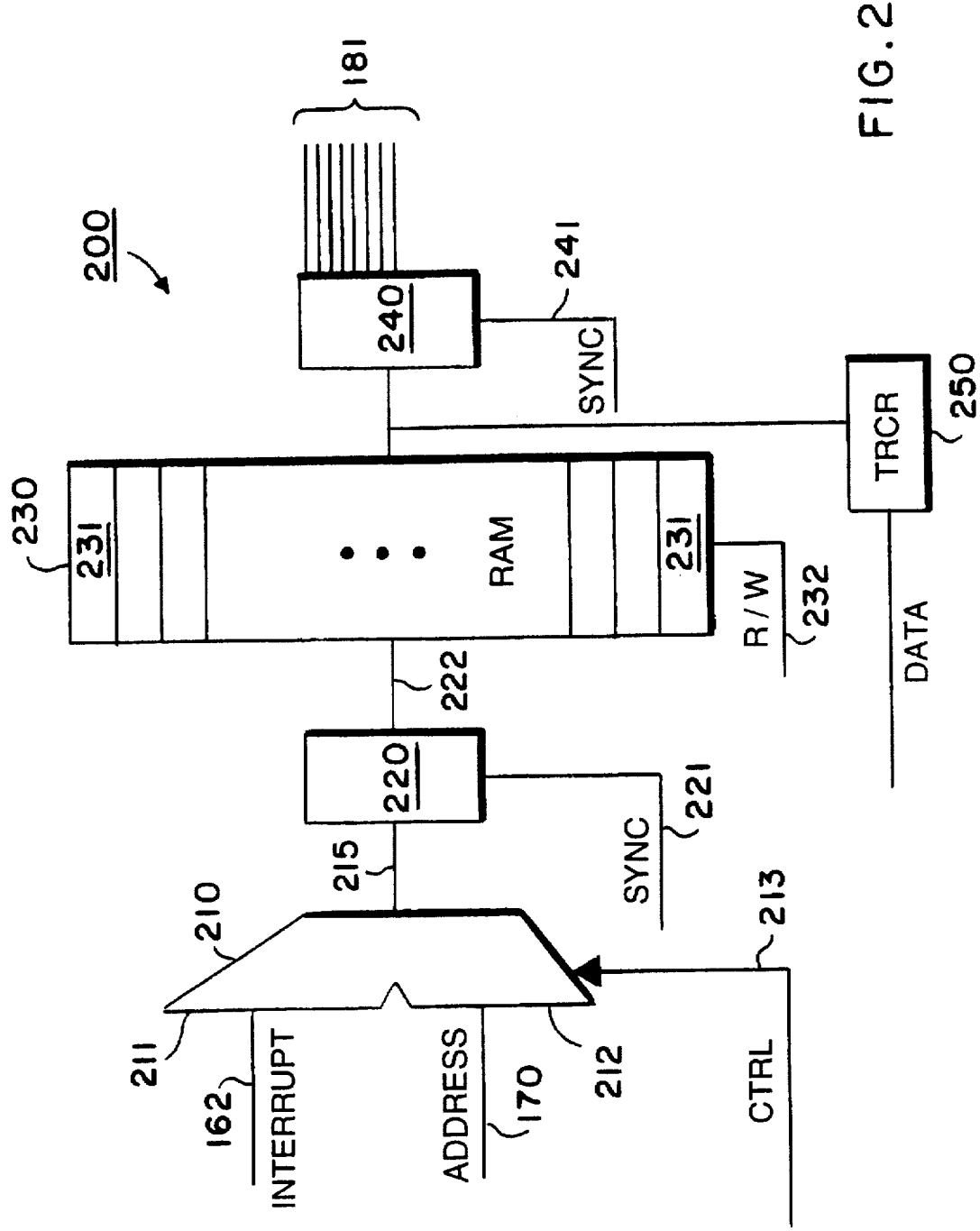
FIG. 2 is a block diagram of a router of the system of FIG. 1.

FIG. 2 shows the programmable router 200 in greater detail. The router 200 includes a de-multiplexer (demux) 210 having a first input side 211 connected to the interrupt lines 162. In one embodiment of the invention, the total number of input interrupt lines to the demux 210 is fifteen. However, it should be understood that the invention can also be worked with a larger or smaller number of input interrupt lines.

A second input side 212 of the demux 210 is connected to receive address from the CPU 110 via the communications buses.

The demux 210 is controlled by a control signal CTRL 213 received via the control lines of the buses. The CTRL signal 213 can select, for example, the input lines of the first or second side of the demux 210.

The selected input lines, first side or second side, are connected to first latches 220 by line 215. The latches 220 are used to synchronize the output from the demux 210 with respect to an interrupt matching synchronization pulse (SYNC) 221.

Figure 3:
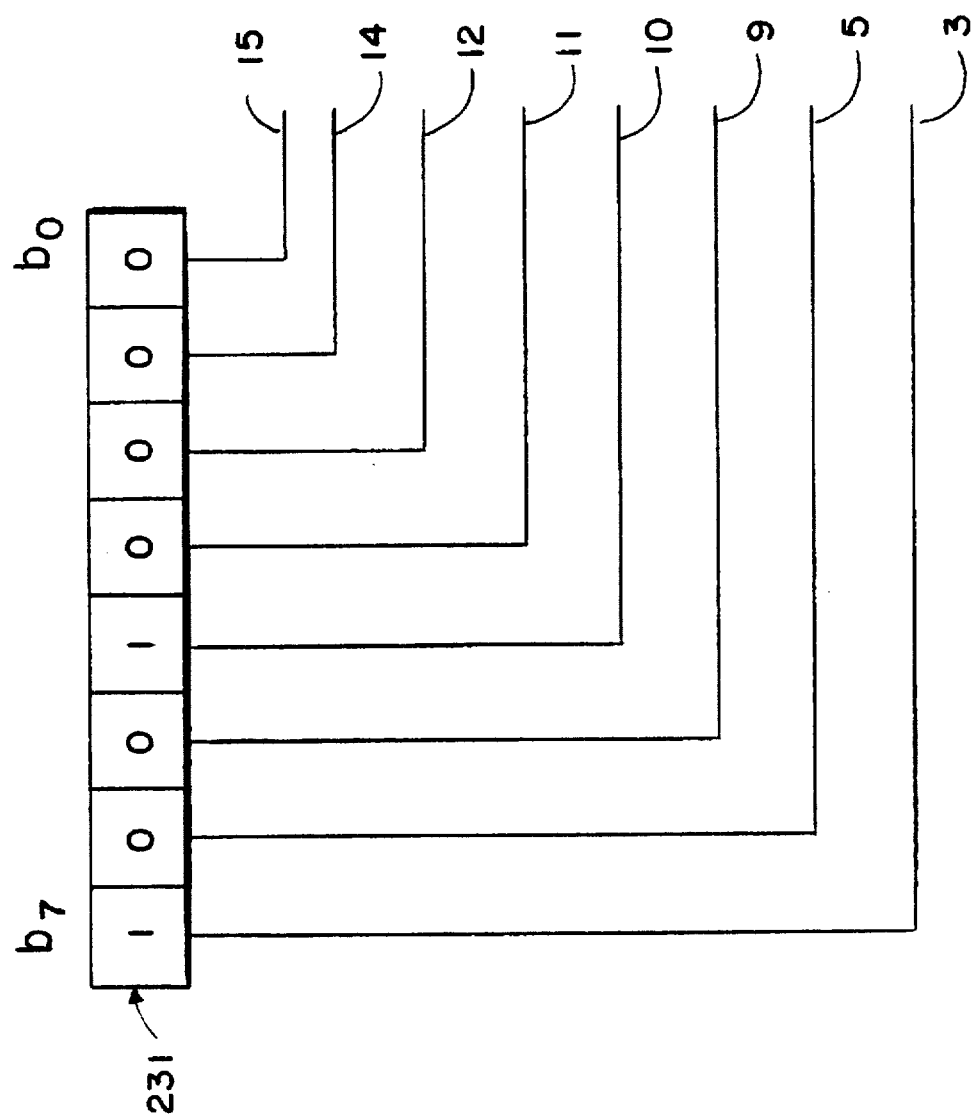
FIG. 3 is a block diagram of a data cell of a memory of the router of FIG. 2.

The output of the first latches 220 is connected as an input to a random accessible memory (RAM) 230 by line 222. The RAM 200 includes, for example, $2^{15}$ storage cells 231, each cell being, for example, eight bits wide, as shown in FIG. 3, and described in greater detail below. The RAM 230 can be controlled for reading or writing data by a read/write signal 232.

The output of the RAM 230 during reading, for example, data stored in the cells 231, is presented to second latches 240, also synchronized by a SYNC signal 241. The output of the latches 240 are connected to the PIC input interrupt lines 181.

During operation of the computer system 100, the router 200 can be programmed by selecting the second side 212, and presenting address signals on lines 170. The data to be written at the referenced addresses can be received via the transceiver 250. The data and addresses can be generated by a software program executing, for example, in the CPU 110. It should be understood that the program can also be executed on a remote processor, if the system 100 of FIG. 1 is connected in a network of distributed processors.

The addresses that are received by the second side 212 of the demux 210 reference the cells 231 of the RAM 230. The data received via the transceiver (TRCR) 250 are stored in the referenced cells 231. Thus, the RAM 230 can be loaded with data under program control at, for example, the time the system 100 is initialized.

FIG. 3 shows one cell 231 of the RAM 230 in greater detail. The cells 231 stored data as a bit pattern. The bits can be labelled, fight-to-left as $b_0$ to $b_7$. Each bit corresponds to one of the interrupt input lines 181, conventionally designated as "IRQ" lines 15, 14, 12, 11, 10, 9, 5, and 3. A logical one in a bit position of the cell indicates a mapping of an interrupt. Thus, a bit pattern of "1001000" will signal interrupts on IRQ lines 10 and 3. The RAM 230 can be programmed to store, for example, $2^{15}$ different bit pattern in the cells 231. Each pattern corresponds to a possible combination of PCI and EISA interrupt lines.

After the RAM 230 has been programmed, it can be used to route interrupt signals during operation of the system 100, explained as follows.

After initialization, when the CTRL signal 213 has selected the first side 211 of the demux 210 and the RAM is in read mode, e.g. during normal, non-programming operation of the system 100, the interrupt signals received on the first side of the demux 210 are used to form an address of the RAM 230. The cell at the referenced address stores the desired mapping or routing of the interrupt signals to the interrupt input lines of the PIC 180 as a bit pattern.

Thus, the system 100 equipped with the router 200 can accommodate thousands of different combinations of interrupt lines, a fast improvement over the limited selections that have been available in the prior art.

The principles of the invention have been described with respect to specific embodiments. It will be apparent to those skilled in the art that various modifications can be made to the embodiments shown. For example, the circuits of the router can be arranged in alternative configuration using components of like design or function. The I/O buses may be compliant with other industry standards, or for that matter, the buses may be of a proprietary design. Therefore, the spirit and scope of the invention are set out in the appended claims.

We claim:

1. An apparatus for routing interrupt signals in a computer system, comprising:

a memory having a plurality of addresses, each of the plurality of addresses to access a bit pattern stored at the corresponding address of the memory;

a plurality of interrupt lines for connecting interrupt sources to the memory, the plurality of interrupt lines configured as address lines of the memory, the plurality of interrupt lines to randomly access the plurality of addresses of the memory;

latch means, responsive to interrupt signals on the plurality of interrupt lines, to store a specific address of the memory, the specific address formed from the interrupt signals on the plurality of interrupt lines; and means for transmitting to an interrupt processor the bit pattern stored at the specific address stored in the latch.

2. An apparatus for routing interrupt signals in a computer system, comprising:

a random access memory having a plurality of cells, each cell randomly accessible by an address;

a plurality of interrupt lines for connecting to interrupt sources, the plurality of interrupt lines configured to address the plurality of cells of the random access memory;

latch means, responsive to interrupt signals generated by the interrupt sources, to store a specific address of the random access memory, the specific address formed from the interrupt signals on the plurality of interrupt lines; and means for transmitting to an interrupt processor a bit pattern stored in the cell of the random access memory accessed by the specific address.

3. The apparatus of claim 2 further comprising:

means for writing the bit pattern to each of the plurality of cells of the random access memory.

4. The apparatus of claim 2 further comprising:

means for selecting the memory for read access or write access; and a multiplexor for selecting the plurality of interrupt lines to form the specific address in the latch means during the read access to the random access memory, and for selecting a plurality of address lines to form the specific address in the latch means during the write access of the random access memory.

5. A method for muting interrupt signals in a computer system, comprising:

receiving, from interrupt sources, interrupt signals on a plurality of interrupt lines;

forming an address of a random access memory from the interrupt signals received on the plurality of interrupt lines;

accessing the random access memory at the address formed by the interrupt signals; and transmitting to an interrupt processor a bit pattern stored at the address of the random access memory selected by the address formed by the interrupt signals.

* * * * *